United States Patent [19]

Thuen

[11] Patent Number: 4,580,810
[45] Date of Patent: Apr. 8, 1986

[54] AIR BAG SYSTEM

[75] Inventor: Ted Thuen, Morris Plains, N.J.

[73] Assignee: Breed Corporation, Lincoln Park, N.J.

[21] Appl. No.: 580,339

[22] Filed: Feb. 15, 1984

[51] Int. Cl.⁴ .............................................. B60R 21/32
[52] U.S. Cl. .................................................. 280/734
[58] Field of Search ....................... 280/728, 731, 734; 180/282

[56] References Cited

U.S. PATENT DOCUMENTS

| | | | |
|---|---|---|---|
| 4,161,228 | 7/1979 | Svensson et al. | 280/734 |
| 4,167,276 | 9/1979 | Bell et al. | 280/731 |
| 4,204,703 | 5/1980 | Okada | 280/734 |

Primary Examiner—John J. Love
Assistant Examiner—Ross Weaver
Attorney, Agent, or Firm—Kane, Dalsimer, Kane, Sullivan and Kurucz

[57] ABSTRACT

An air bag system adapted to be mounted on the axis of a steering wheel of a vehicle includes a sensor mounted inside an inflator for the air bag. The sensor is maintained safe prior to mounting the air bag system on the steering wheel and when mounted the sensor is caused to arm.

13 Claims, 9 Drawing Figures

AIR BAG SYSTEM

BACKGROUND OF THE INVENTION

Initially and during the 1970's the major effort for most of the air bag research was in designing systems that would satisfy Motor Vehicle Safety Standard 208 (MVSS 208). Consequently, the auto companies concentrated their efforts on 30 mph frontal and angular barrier crashes. Only a small percentage of crashes staged by the auto companies were other than 30 mph barrier crashes and only a hand full were impacts other than barrier crashes. By contrast, for example, in real world experience the ratio of fatal pole crashes to fatal barrier type crashes is about 7:1.

The dominance of 30 mph barrier crash resulted in simplistic sensor criteria. In particular, it became universally accepted that if an occupant, represented mathematically as an unrestrained free mass, would strike the interior passenger compartment at 12 mph or above that an air bag was required. Since the maximum distance that an occupant can be positioned away from the passenger compartment interior is about two feet, it was computed that if the velocity change exceeded 12 mph prior to the time that the occupant displacement had exceeded 24 inches then an air bag was required. Once it was determined that an air bag was required for a given crash, then it was required that the sensor activate to initiate air bag inflation in time to permit 30 milliseconds of inflation time prior to the time that the occupant had moved 5 inches. This requirement always resulted in the air bag inflating in time for all types of accidents, and, in particular, for the 30 mph barrier crashes.

Initially and during the 1970's, in order to satisfy the sensor activation criteria for soft crashes such as angle barrier crashes and some car-to-car crashes, sensors had to be placed in the crush zone of the car. The crush zone is that portion of the car which experiences a velocity change early in the crash before the total car has slowed down. However, it was recognized in the mid-1970's that considerable economies in the air bag system could be realized through use of an all mechanical sensor in proximity to and integral with the gas generator. Through considerable research, development and evaluation, it was determined by the assignee Breed Corp. through computer mathematical modeling using data from hundreds of crashes supplied by seven of the worlds largest automobile manufacturers, that a sensor located out of the crush zone in the automobile can initiate air bag inflation in time to keep the injury level sustained by the driver below acceptable limits. The importance of this conclusion is that the cost of a driver-side-only air bag system, for example, would be reduced by about a factor of 5 and in addition there would be a dramatic improvement in system reliability.

A proposed driver's side air bag system is disclosed in the Bell U.S. Pat. No. 4,116,132. In this Bell Patent the sensor is placed on the side of the inflator housing. This known design has many disadvantages. The existence of a hole in the housing requires that the wall thickness be substantially increased to meet the pressure requirements, since it has been weakened by the presence of the hole. Notwithstanding the location of the sensor, the inflator housing must be designed to withstand several thousand psi of pressure caused by the burning of the propellant. Similarly this sensor itself in the Bell system, must have a housing which will withstand substantial pressures. Otherwise, the sensor will most likely rupture when the gas generator material is burning. If the sensor is outside the inflator, therefore, as shown in this Bell patent, the weight of the inflator will be significantly greater. This, in turn, increases the weight of the steering wheel and the bracketry which holds the steering column in position must be strengthened. This increase in bracket strength and bracket weight is extremely significant due to the fact that the extra inflator weight occurs at the end of a cantilevered shaft. This added weight also makes retrofitting vehicles more difficult due to this added bracketry requirement.

If the sensor is placed outside of the inflator and not physically attached to it, a serious decrease in system reliability results. The sensor now must be attached to the inflator either electrically, or with some sort of pyrotechnic transmission cord. Since there is a significant probability that this link could be broken, a system of monitoring the integrity of this link is probably required. This monitoring system would be undoubtedly electrical, requiring a connection to the vehicle battery. For the steering wheel mounted system, this would necessitate slip rings, a wire harness, an indicator light, and some electronic circuitry. This in turn results in a tremendous increase in system complexity, cost and added possibility of malfunction.

In addition to the many foregoing disadvantages the high cost of prior art air bag systems has been the primary impediment to their utilization.

SUMMARY OF THE INVENTION

A principal object of the present invention is to provide an improved air bag system which places the sensor within the inflator housing.

When the sensor is mounted inside the inflator, it becomes much more difficult for the sensor to become accidentally or intentionally damaged. This results in a significant improvement in system reliability since the sensor is enclosed within the inflator and therefore within a very strong steel container. For an inflator to burn properly it is important that it be ignited uniformly and symmetrically. This is readily accomplished by placing the sensor in the center of the inflator where the ignitor mix can be easily and reliably initiated.

Another object of the present invention is to provide an all mechanical air bag system that would reduce system costs to a small fraction of the cost of previous systems.

A further object is the placement of the sensor inside the inflator which results in a very simple, neat, symmetrical module which becomes very easy to install. The angular orientation of the inflator, for example, under these circumstances becomes unimportant. Similarly, should it be desirable to retrofit an automobile with a driver's side air bag module, this becomes a relatively simple task with a low probability of misassembly.

It has been determined that the sensor should be mounted on the axis of the steering wheel to minimize the effects of vibration to which sensors would otherwise be sensitive.

It has also been determined that a system located within the gas generator in the steering wheel hub would be far simpler, more reliable and dramatically less costly than present day driver's side air bag systems. An all mechanical crash sensor/initiator eliminates the need for all remote located crash sensors, associated wiring, electrical connnectors and condensors, slip rings, the electric squib and the electronic diagnostic system along with associated installation costs. All of the foregoing factors result in a significant reduction in cost.

DETAILED DESCRIPTION

Figure 1:
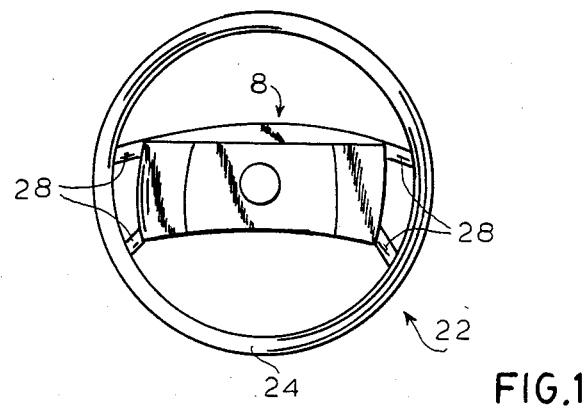
FIG. 1 is a top plan view of a driver side air bag system of the invention shown mounted on the vehicle steering wheel.
Figure 2:
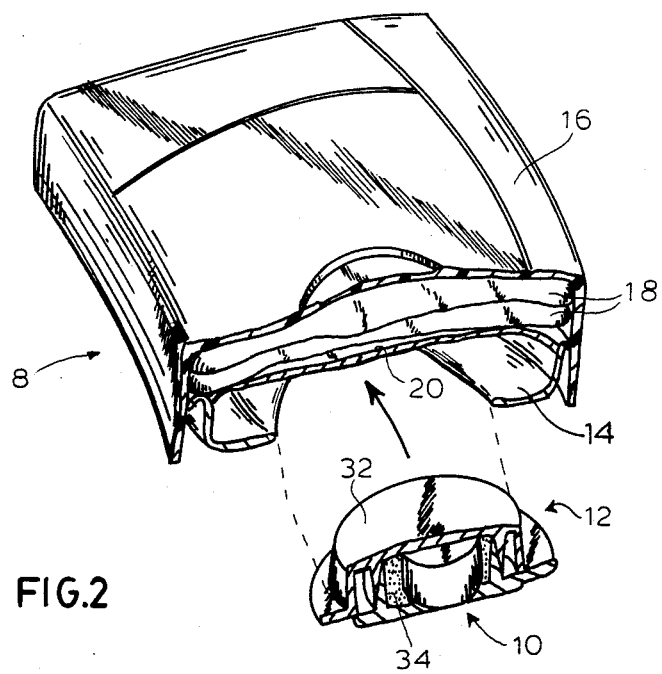
FIG. 2 is an exploded perspective view of the air bag system with certain parts broken away and removed.
Figure 4:
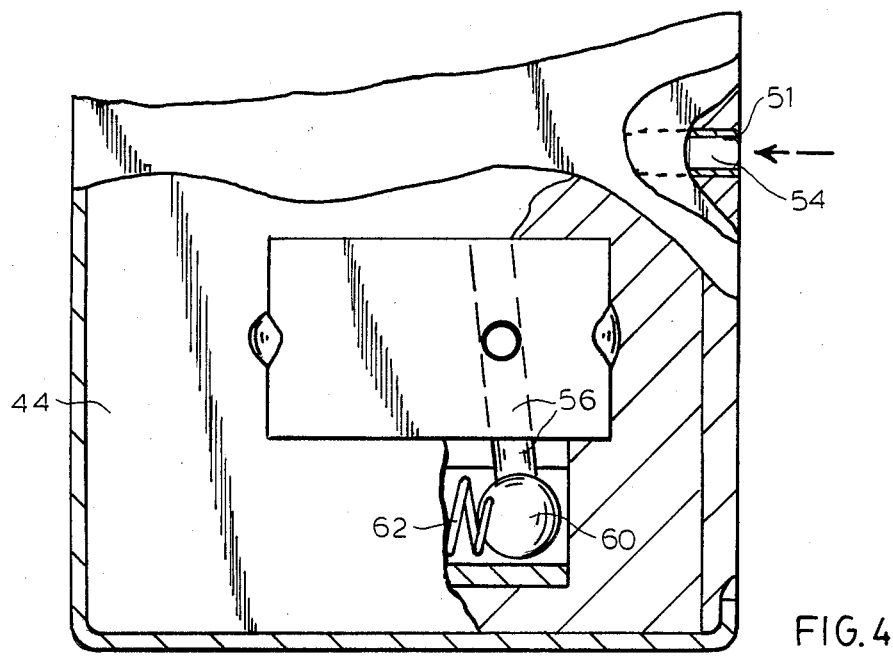
FIG. 4 is an enlarged fragmentary view including the end of the D- shaft and the mounting plate supporting the D-shaft.
Figure 3:
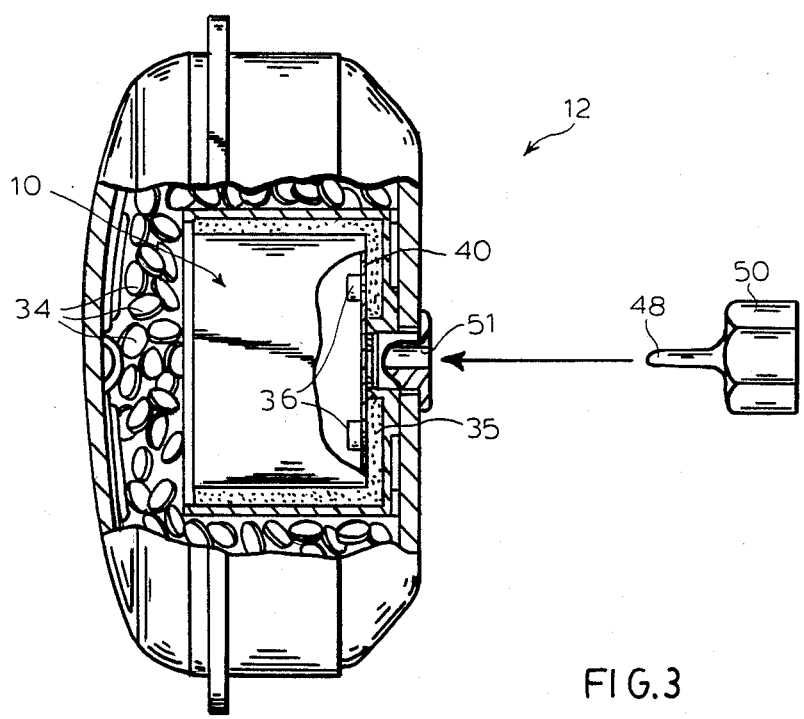
FIG. 3 is a side elevational view of the sensor with the gas generator with certain parts broken away and removed, showing a pin extending from a steering wheel nut which arms the sensor when assembled to the steering wheel.
Figure 5:
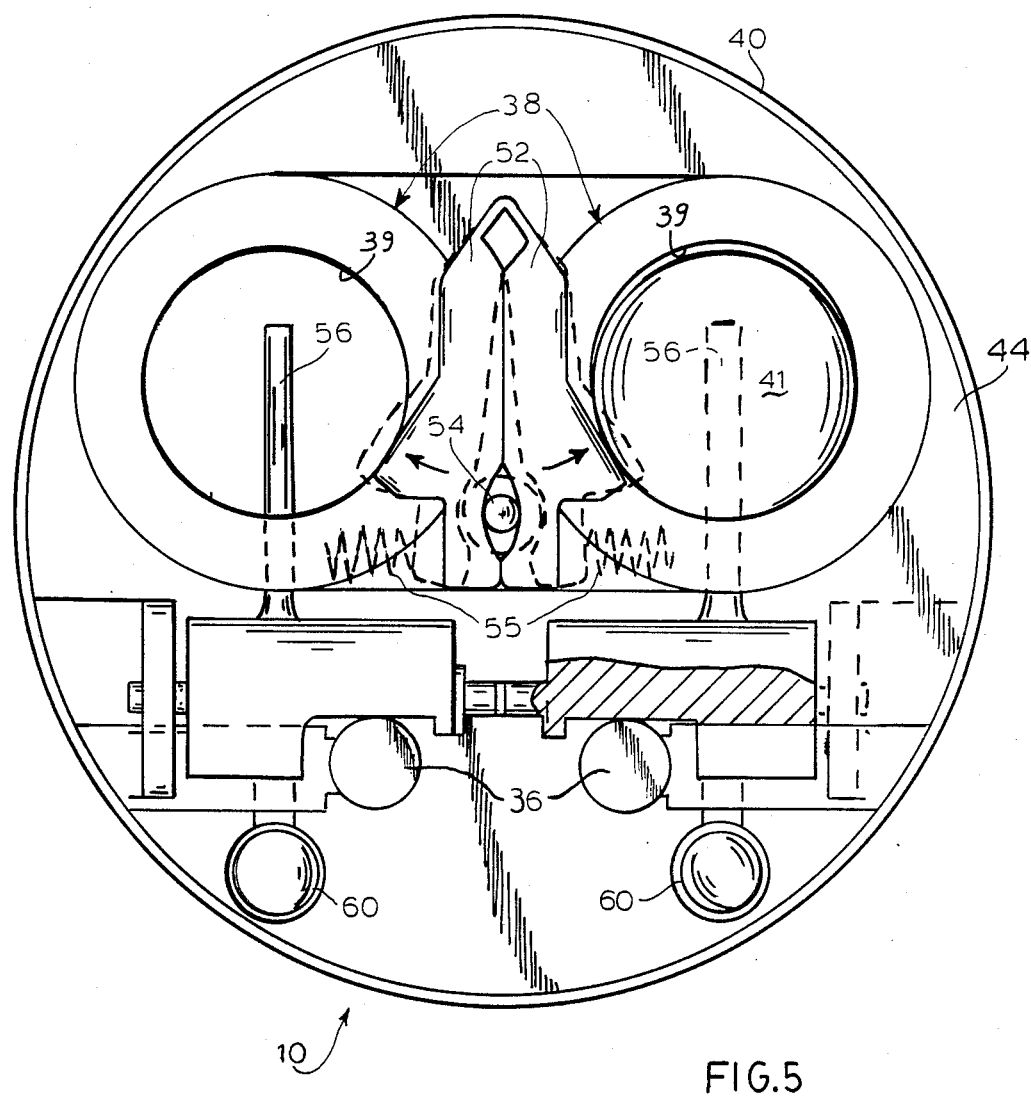
FIG. 5 is a top plan view of the sensor with the cover removed and other parts broken away and removed showing the position of the arms when the sensor is armed with dash lines showing the position of the arms when the sensor is safe.
Figure 6:
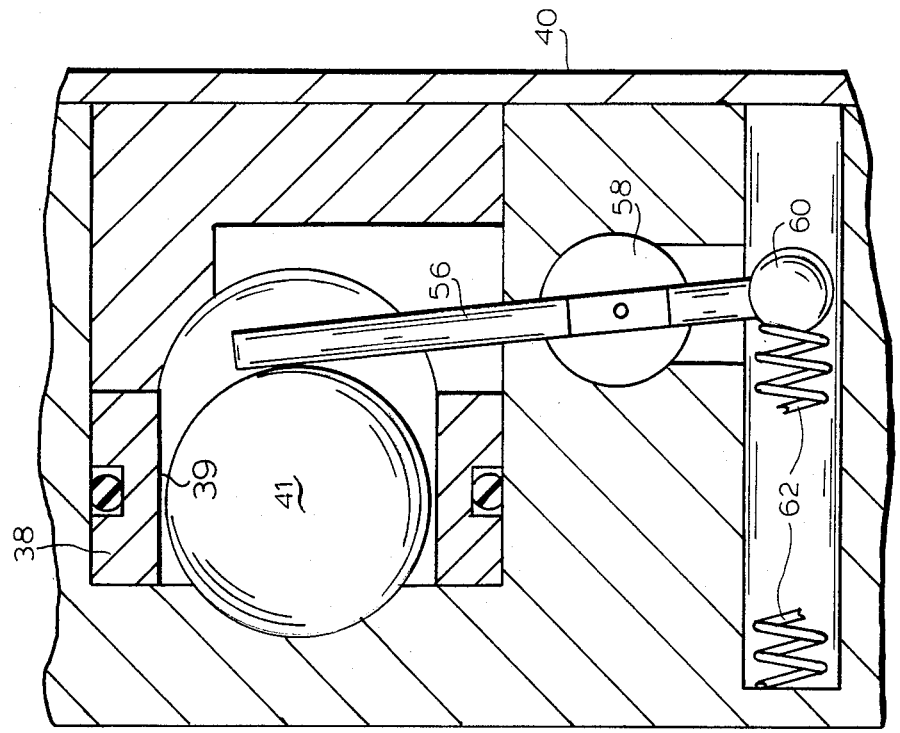
FIG. 6 is an enlarged fragmentary view of the sensing mass and associated pin extending from the D-shaft prior to movement of the sensing mass incident to a crash.

In the drawings, an air bag safety restraint system 8 includes a sensor-initiator 10 mounted inside the gas generator or inflator 12. The inflator 12 is symmetrically mounted on a frame 14 to which is also mounted the housing or cover 16 for the folded air bag 18. The air bag housing 16 is made of a frangible material and encloses and protects the folded air bag 18 to prevent damage to the bag when it is stored and in its uninflated condition.

The air bag safety restraint system 8 is associated with a vehicle steering wheel 22 through the frame 14. The steering wheel 22 includes an outer rim 24, and a suitable number of spokes 28.

The gas generator 12 includes housing 32 containing a gas generating material 34 which may be sodium azide or any other appropriate substance. Sodium azide is stable over a wide range of temperatures but when ignited it rapidly decomposes, releasing a large volume of nitrogen gas. An ignitor mix 35 is also symmetrically arranged within the gas generator 12 about and around the sensor-initiator 10 as shown and is adapted to be ignited by the ignition of the primers 36 of the sensor-initiator 10. The ignitor mix is an easily ignited, fast burning pyrotechnic material which occupies the space between the sensor-initiator 10 and the gas generating material 34.

Reference is now made to the sensor-initiator 10 which contains a pair of redundant sensors 38 which are adapted to actuate the primers 36 within the housing 40. Each sensor 38 includes a sensing mass 41 capable of limited movement within the cylinder 39 in the block 44 contained within the housing 40. Before the air bag safety restraint system 8 is mounted on the steering wheel 22, movement of the sensing mass 41 within the respective cylinder 39 is prevented. When the system is mounted on the steering wheel, a pin extension 48 which is part of the nut 50 which holds the steering wheel onto the steering column, enters the lock pin hole 51, in the sensor-initiator 10. This pin extension 48 shifts conical lock pin 54, permitting the sensing mass lock arms 52 to rotate out of the path of the sensing masses 41, thereby arming the system. The locking arms 52 have a common connection and operate under the bias of springs 55 which urge the arms towards one another. When unarmed the arms are kept apart and consequently in engagement with the sensing masses 41 to prevent movement of the sensing masses 41. When the sensors are rendered safe, the larger diameter part of the conical pin 54 is engaged with the arms 52 to thereby keep them apart. When the pin 54 is moved inwardly the smaller diameter of the conical shape of the lock pin 54 is exposed to the arms which under the urging of the springs 55 are moved towards one another to thereby free the sensing masses 41. As explained previously the inward movement of the conical pin 54 is caused by the pin 48 of the steering wheel nut 50.

Each sensing mass 41 is associated with a pin 56 extending from a "D-shaft" 58. The other end of each pin 56 includes the spherical ball 60 in engagement with a biasing spring 62 to assure the interengagement of pin 56 with its associated sensing mass 41. Each D-shaft 58 is provided with a flat face 64 formed in a generally cylindrically shaped exterior surface. A spring biased firing pin 66 is in alignment with the primer 36 and is maintained in a retracted position by the cylindrically shaped exterior of the D-shaft 58 and is permitted to be released when aligned with the face 64.

Figure 7:
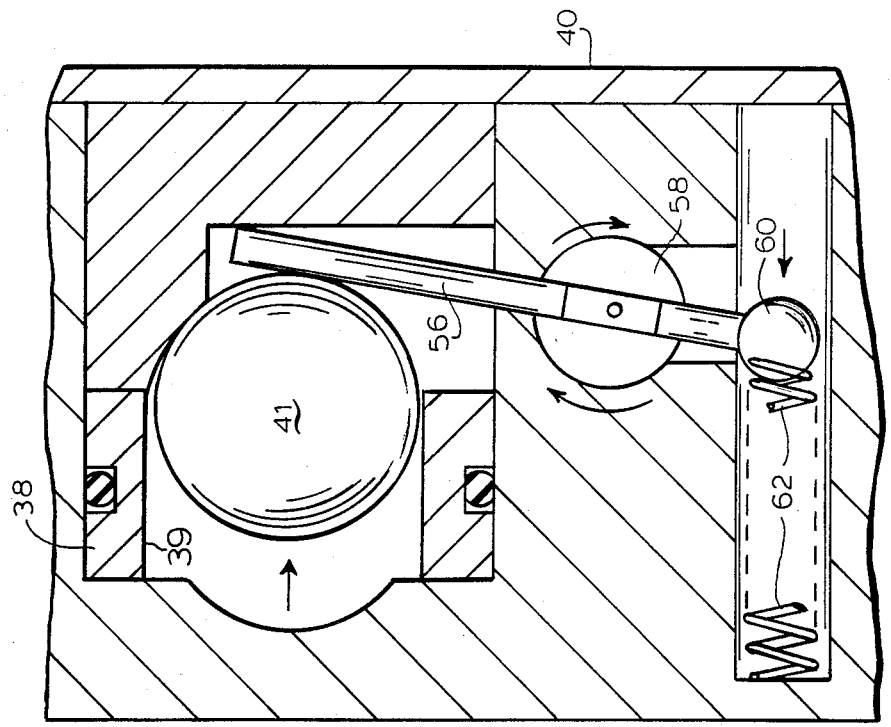
FIG. 7 is a similar view showing the sensing mass shifted as a result of a crash and showing the movement of the associated pin and the D-shaft.
Figure 8:
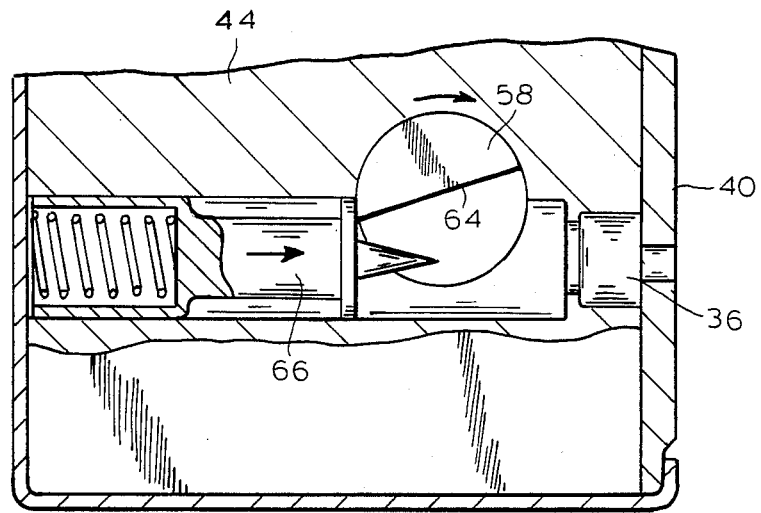
FIG. 8 is an enlarged fragmentary view of the firing pin held in a retracted position by the D-shaft.
Figure 9:
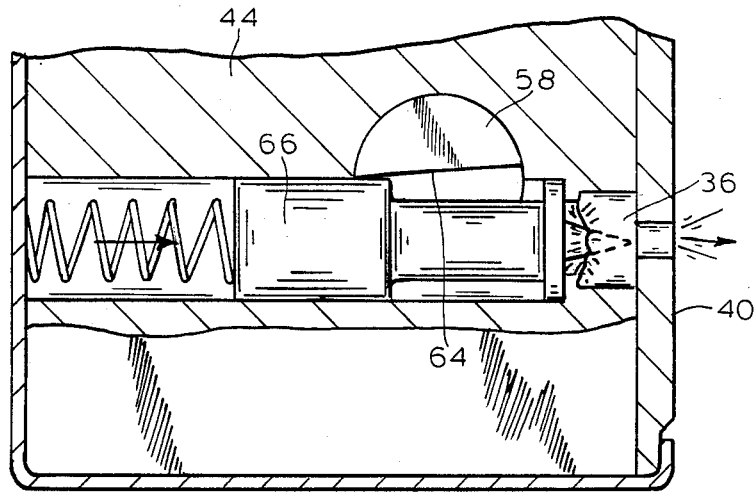
FIG. 9 is a similar view with the firing pin released as a result of a collision.

In the event that an automobile experiences a crash, each sensing mass 41 moves to the right as shown in FIG. 7. However, this motion is resisted by the bias spring 62 acting through the pin 56 and by the air pressure differential between the left and right sides of the sensing mass 41. This pressure is gradually relieved by virtue of the air flowing in the clearance between the sensing mass 41 and its associated cylinder 39. If the crash is of sufficient severity, the sensing mass 41 will move sufficiently to the right to cause the D-shaft 58 to rotate enough to clear the firing pin 66 and permit it to move past face 64 and impact primer 36 which then ignites and causes the ignition of the ignitor mix 35. The ignitor mix initiates the burning of the gas generating material, which, in turn, inflates the air bag.

Although a driver's side system has been described herein, it is obvious that many of the advantages of this invention would apply to a passenger air bag restraint system.

Similarly, although an automobile system has been described herein, it is obvious that the advantages of this invention would apply to protection of operators and passengers of other types of vehicles such as trucks, boats, airplanes and trains.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. An air bag safety restraint system comprising:

an inflatable air bag;

a gas generator having a housing and an ignitable gas generating material contained therein in fluid communication with the interior of the bag said bag being external to said housing;

ignition means for igniting the gas generating material, said ignition means being within the gas generator housing; and a sensor mounted within the housing of the gas generator for sensing the crash and initiating the ignition means.

2. The invention in accordance with claim 1 wherein the air bag safety restraint system is adapted to be mounted on the steering wheel of a vehicle, and including means whereby the sensor is maintained safe prior to mounting on the vehicle and means for causing arming of the sensor upon mounting of the air bag safety restraint system on the vehicle.

3. The invention in accordance with claim 1 wherein the sensor includes redundant means for sensing the crash and causing ignition of the ignition means.

4. The invention in accordance with claim 1 wherein the sensor includes a movable mass, a rotatable shaft, means for translating movement of the mass to rotation of the shaft, a primer, a spring biased firing pin maintained in a retracted position by the shaft and means for releasing the firing pin to strike the primer upon predetermined rotation of the shaft to initiate the ignition of the ignition means.

5. The invention in accordance with claim 4 wherein the mass is a spherical ball adapted for limited movement within a cylinder in the sensor.

6. The invention in accordance with claim 5 wherein the means for translating movement of the sensing mass to rotation of the shaft includes a radially extending pin on the shaft which is adapted to engage the sensing mass.

7. The invention in accordance with claim 6 wherein the pin is provided with a diametrically opposed extension extending beyond the shaft, operatively engaged with a resilient member whereby the pin is urged against the sensing mass.

8. The invention in accordance with claim 4 wherein the shaft is a "D-shaft" including a face which provides clearance for the firing pin when the shaft is rotated a predetermined amount.

9. The invention in accordance with claim 2, wherein the sensor is mounted coaxially with the steering wheel.

10. The invention in accordance with claim 1, wherein a frangible air bag cover is provided and the air bag is disposed therein.

11. An air bag safety restraint system comprising:
an inflatable air bag;
inflation means for inflating the bag;
a sensor-initiator adapted for mounting coincident with the axis of the steering column of a vehicle, the sensor-ionitiator being adapted to sense a crash to activate the inflation means.

12. The invention in accordance with claim 11, wherein the sensor-iniator includes redundant means for sensing the crash and causing activation of the inflation means.

13. The invention in accordance with claim 11, wherein the sensor-initiator includes a movable mass, a rotatable shaft, means for translating movement of the mass to rotation of the shaft, a primer, a spring biased retracted firing pin maintained in a retracted position by the shaft and means for releasing the firing pin to strike the primer upon predetermined rotation of the shaft to initiate the activation of the inflation means.

* * * * *